(12) United States Patent
Zalewski

(10) Patent No.: US 10,393,878 B2
(45) Date of Patent: Aug. 27, 2019

(54) VEHICLE-TO-X-COMMUNICATION MODULE

(71) Applicant: Continental Teves AG & Co. oHG, Frankfurt (DE)

(72) Inventor: Michael Zalewski, Frankfurt am Main (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 270 days.

(21) Appl. No.: 15/506,290

(22) PCT Filed: Sep. 24, 2015

(86) PCT No.: PCT/EP2015/071999
§ 371 (c)(1),
(2) Date: Feb. 24, 2017

(87) PCT Pub. No.: WO2016/046323
PCT Pub. Date: Mar. 31, 2016

(65) Prior Publication Data
US 2018/0224554 A1    Aug. 9, 2018

(30) Foreign Application Priority Data
Sep. 25, 2014   (DE) .................. 10 2014 219 385

(51) Int. Cl.
*G01S 19/05* (2010.01)
*H04W 4/04* (2009.01)
*H04W 4/46* (2018.01)

(52) U.S. Cl.
CPC ............. *G01S 19/05* (2013.01); *H04W 4/046* (2013.01); *H04W 4/46* (2018.02)

(58) Field of Classification Search
CPC ........ G01S 19/05; G01S 19/258; G01S 19/06; G01S 19/07; G01S 19/256; H04W 4/46; H04W 4/046
USPC ..................................... 342/357.42
See application file for complete search history.

(56) References Cited

U.S. PATENT DOCUMENTS

| | | | |
|---|---|---|---|
| 8,884,817 B2 | 11/2014 | Seymour | |
| 2004/0193372 A1 | 9/2004 | MacNeille et al. | |
| 2009/0271112 A1* | 10/2009 | Basnayake | G01S 5/0072 |
| | | | 701/469 |

(Continued)

FOREIGN PATENT DOCUMENTS

| | | |
|---|---|---|
| DE | 102008042230 A1 | 1/2010 |
| DE | 102010061599 A1 | 7/2011 |

(Continued)

OTHER PUBLICATIONS

International Search Report and Written Opinion for International Application No. PCT/EP2015/071999, dated Dec. 4, 2015, 10 pages.

(Continued)

*Primary Examiner* — Harry K Liu
(74) *Attorney, Agent, or Firm* — RatnerPrestia

(57) ABSTRACT

A vehicle-to-X communication module which is configured to transmit operating data to a satellite navigation module. In this way, supply of operating data to the satellite navigation module can be facilitated and, in particular, in many cases reception of the operating data by Assisted GPS (AGPS) can be dispensed with.

18 Claims, 1 Drawing Sheet

(56) References Cited

U.S. PATENT DOCUMENTS

| | | | |
|---|---|---|---|
| 2011/0080302 A1* | 4/2011 | Muthaiah | H04L 47/10 340/903 |
| 2012/0209519 A1* | 8/2012 | Basnayake | G01C 21/32 701/457 |
| 2014/0070980 A1* | 3/2014 | Park | G01S 19/42 342/118 |
| 2014/0164582 A1* | 6/2014 | Dawson | H04W 48/18 709/221 |
| 2015/0099533 A1* | 4/2015 | Menouar | G01S 19/42 455/456.1 |
| 2015/0149083 A1* | 5/2015 | Lee | G01C 21/26 701/468 |
| 2015/0195827 A1* | 7/2015 | Feng | H04L 63/0428 380/270 |

FOREIGN PATENT DOCUMENTS

| | | | |
|---|---|---|---|
| JP | 2005106720 A | | 4/2005 |
| WO | 03028392 A1 | | 4/2003 |
| WO | 2013142946 A1 | | 10/2013 |

OTHER PUBLICATIONS

German Search Report for German Application No. 10 2014 219 385.0, dated Aug. 27, 2015, 11 pages.

International Preliminary Report on Patentability and Written Opinion for International Application No. PCT/EP2015/071999, dted Mar. 28, 2017, 10 pages.

* cited by examiner

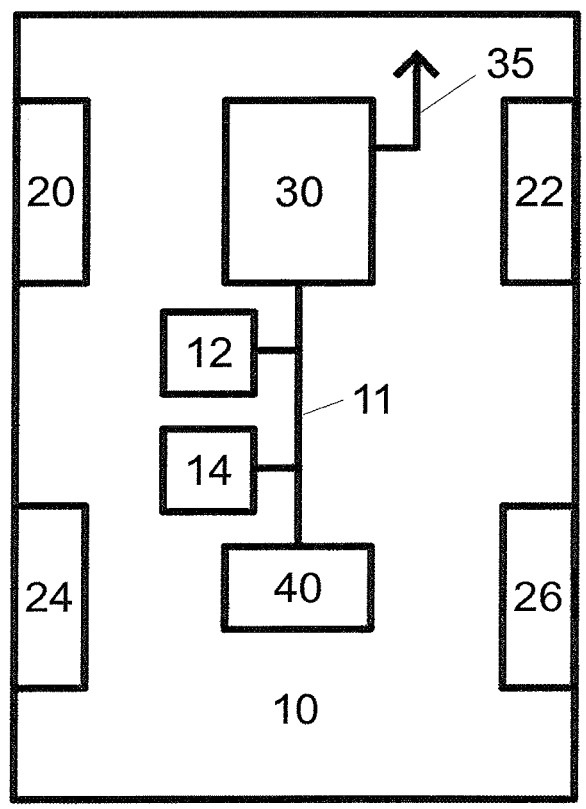

VEHICLE-TO-X-COMMUNICATION MODULE

CROSS REFERENCE TO RELATED APPLICATIONS

This application is the U.S. National Phase Application of PCT International Application No. PCT/EP2015/071999 filed Sep. 24, 2015, which claims priority to German Patent Application No. 10 2014 219 385.0, filed Sep. 25, 2014, the contents of such applications being incorporated by reference herein.

FIELD OF THE INVENTION

The invention relates to a vehicle-to-X communication module for a vehicle, wherein the vehicle-to-X communication module is configured to exchange data with other vehicles.

BACKGROUND OF THE INVENTION

Vehicle-to-X communication modules are used to provide communication between individual vehicles, in particular motor vehicles, and communication by a vehicle with infrastructure facilities. The former is typically referred to as vehicle-to-vehicle-communication, while the latter is typically referred to as vehicle-to-infrastructure communication. The communication with other vehicles or with infrastructure facilities typically takes place directly and thus without the intermediary of a cellular telephone network.

Vehicles which are equipped with such vehicle-to-X communication modules, frequently have satellite navigation modules. These are configured to detect the location of the vehicle, or also parameters such as speed and direction of movement, based on satellite signals. To this end, typical satellite navigation systems like a GPS have a plurality of satellites, the signals of which can be received by such a satellite navigation module.

If the location of the vehicle is unknown, then this can essentially be determined by means of satellite navigation, but if no supporting data for this is available this can take a long time. This is because the satellite navigation module in this case must first analyze frequencies from a plurality of satellites for receivability, wherein only very few of these satellites are actually in a position that allows reception. If receivable satellite signals are found, then a certain amount of time is still required until almanac and ephemerides data are received, which simplify the further operation of the satellite navigation module and/or the processing of satellite navigation signals and allow position determination. For ephemerides data this can typically take 30 seconds, and for almanac data typically 12.5 minutes.

To speed up the location identification by means of a satellite navigation module, a service has been set up that is referred to as Assisted GPS (AGPS). Operating data of a satellite navigation module, which particularly can be used to accelerate the position determination and the satellite reception, by means of wireless communication, particularly by means of a cellular network, are therefore provided. Receipt of such AGPS information is possible both for vehicles and for other devices equipped with satellite navigation modules such as, for example, cellphones. For this, however, a suitable infrastructure, particularly a cellular connection, is necessary, which can create further effort and costs. Fees may also be payable for use of the AGPS service.

SUMMARY OF THE INVENTION

Therefore an aspect of the invention offers the possibility of providing operating data for a satellite navigation module of a vehicle in a simpler manner.

An aspect of the invention relates to a vehicle-to-X communication module for a vehicle. The vehicle-to-X communication module is designed to exchange data with other vehicles. According to the invention it is provided that the vehicle-to-X communication module is configured to send operating data of a satellite navigation module to a satellite navigation module arranged in the vehicle.

By means of the vehicle-to-X communication module according to an aspect of the invention, in certain implementations a vehicle-to-X communication module that is already present in the vehicle can be advantageously used to supply the satellite navigation module with operating data. A number of possibilities for this exist, as described further below.

The vehicle-to-X communication module is typically configured to directly exchange data with other vehicles or with infrastructure facilities. This can particularly be understood to take place without the intermediary of a cellular network.

When it is stated that the vehicle-to-X communication module is configured for something, this particularly means that the vehicle-to-X communication module is programmed by means of software or hardwired functions to provide the corresponding functionality.

The vehicle-to-X communication module can particularly be implemented in the form of a microcontroller, a microprocessor, a freely programmable computer, an Application Specific Integrated Circuit (ASIC) or a programmable logic controller (PLC). It can particularly contain processor means and storage means, wherein code is stored in the storage means, and when this is executed the processor behaves in a defined, particularly in a desired, manner. The vehicle-to-X communication module can also be integrated into another unit which can execute further functions.

The vehicle-to-X communication module may be configured, in response to an impending switching off of the satellite navigation module, to receive and store operating data from the satellite navigation module. This allows the storage of currently valid operating data of the satellite navigation module and thus bridging of a time for which the vehicle ignition is by way of example switched off. For this, particularly, no memory and no uninterruptible power supply to the satellite navigation module need be provided.

The vehicle-to-X communication module may be configured, in response to the switching on of the satellite navigation module, to send the stored operating data to the satellite navigation module. Thus, at the end of the above-mentioned vehicle downtime the satellite navigation module can be supplied with the most recent valid operating data.

The vehicle-to-X communication module may be configured, in response to the switching on of the satellite navigation module, to initially check if the operating data are still valid, particularly on the basis of a time that has elapsed since the switching off, and to only send them to the satellite navigation module if they are still valid. Thus, by way of example, the satellite navigation module can be prevented from receiving operating data, which is no longer valid, by way of example because between switching off and switching on too much time has elapsed, or because the vehicle, by way of example, has been moved onto a ferry or a motorail train and has thus been removed from the range of validity of the data. By way of example, validity of the operating data can be assumed if the time elapsing since the switching off is below a predefined threshold. Similarly, for checking the validity, other location information, by way of example from a triangulation in a cellular network or from the recognition of known places or landmarks, can be used.

The vehicle-to-X communication module may be configured to receive the operating data from another vehicle. This allows operating data to be received in a simple manner from another vehicle, particularly located in the vicinity, which typically has up-to-date operating data available. Thus, particularly mutual assistance between the vehicles in relation to operating data of satellite navigation modules can be established.

In one aspect of the invention, the vehicle-to-X communication module is configured to receive the operating data in a vehicle-to-X-message directly from the other vehicle. In this way, the inclusion of a complex and possibly expensive cellular network can be dispensed with. Moreover, the method can also be performed in areas where there is no cellular network reception.

The vehicle-to-X communication module may be configured to send a message to another vehicle or a plurality of other vehicles, wherein the message contains a request to send operating data to the vehicle. Thus, the sending of operating data can be requested as required, wherein this simplifies the mutual assistance between the vehicles even further. Such a message can particularly be sent if there is a current requirement for valid operating data. Furthermore, the request can also contain the request for operating data and/or correction data, which by way of example are provided via chargeable services.

The vehicle-to-X communication module may be configured to send the message, containing a request to send operating data, in a vehicle-to-X message, directly to the other vehicle or vehicles. In this way also, the inclusion of a cellular network can be avoided in an advantageous manner.

The vehicle-to-X communication module may be configured to receive the operating data from another vehicle in response to the stored operating data being found to be invalid. It can preferably also be configured to send the message containing a request to send operating data in response to the stored operating data being found to be invalid. Such implementations allow operating data to be accurately received and/or requested from other vehicles, if stored operating data is found to be invalid. This allows, by way of example, it to be provided that operating data upon switching off of the satellite navigation module, thus, by way of example, upon stopping the vehicle and switching off the ignition, are initially stored in the vehicle-to-X communication module, wherein these are initially checked for validity, when the vehicle is put into operation again. If they are valid, they are used. If they are invalid, operating data are received or requested from other vehicles.

The vehicle-to-X communication module may be configured to receive the operating data via a cellular network, particularly by means of Assisted GPS (AGPS). This can provide a fallback level, so that the operating data, particularly in cases in which no valid operating data have been stored and/or no valid operating data can be received or requested from other vehicles, can be received via a cellular network and the existing AGPS infrastructure.

The vehicle-to-X communication module may be configured to send vehicle speed data and/or vehicle direction of travel data to the satellite navigation module. This preferably takes place together with the operating data. Such vehicle speed data or vehicle direction of travel data can also assist the satellite navigation module in determining the position as quickly as possible and keeping track of it.

The vehicle-to-X communication module may be configured to check and/or determine location data of the vehicle as a component of the operating data prior to sending the operating data, by comparing these with an environment status and/or by determining a distance to a known object. In this way, by way of example, it can be identified if existing location data are still valid, or if the location of the vehicle, by way of example due to transportation on a ferry or a motorail train has changed to such an extent that it can no longer be considered valid. Sending wrong location data to the satellite navigation module, which would cause a considerable delay in the position determination, can in this way be advantageously prevented.

The vehicle-to-X communication module may be configured to send time data as a component of the operating data to the satellite navigation module. Such time data can similarly assist in rapidly locating satellite navigation signals.

The vehicle-to-X communication module may be configured to receive the time data from a local time reference or from another vehicle. A local time reference can, by way of example, be a clock present in the vehicle. A radio clock receiver, by way of example a receiver for the German standard time and frequency signal service DCF77, may also, by way of example, be involved. The time data can, however, be received from another vehicle, which in turn allows mutual support between vehicles, here through the comparison and exchanging of time references.

Regarding the time data, a message can be sent to other vehicles, containing a request to transmit time data, in the same way as stated above with regard to the sending of operating data.

According to an aspect of the invention, the operating data comprise almanac data and/or ephemerides data. Almanac data are understood particularly to be orbital data and time information from all satellites, time information on the global world time (UTC), atmospheric data and/or information on the integrity of the signals emitted. Ephemerides data are understood particularly to be data containing more accurate orbit data and time information from individual satellites, and more frequent information on the integrity of the signals emitted. The increased frequency of ephemerides data can, by way of example, mean updating every 2 hours compared with updating every 24 hours with almanac data. Such data have proven particularly advantageous for the operation of satellite navigation systems, particularly for the quickest possible location determination and search algorithm optimization of the satellite navigation system.

It is understood that the features and procedures disclosed in connection with a vehicle-to-X communication module can also be formulated as a method, particularly as a method for operating a vehicle-to-X communication module, or as a method which is implemented in a vehicle-to-X communication module. Such methods can be said to be a component of the disclosure of this application, including all variants and implementations described.

It is furthermore understood that an aspect of the invention also relates to a general communication module, which can be used in any network, particularly cellular networks, which is therefore not restricted to vehicle-to-X-communication, and which instead is implemented according to one or more of the variants described here.

It is further understood that an aspect of the invention also relates to an arrangement of a vehicle-to-X communication module according to the invention and a satellite navigation module, and to a vehicle, particularly a motor vehicle, with such an arrangement. Regarding the vehicle-to-X communication module, all variants and versions described can be referred to here.

BRIEF DESCRIPTION OF THE DRAWINGS

Further features and advantages will be indicated to the person skilled in the art by the following exemplary embodiments described in the following by reference to the attached drawing. FIG. 1 is a schematic representation of a vehicle-to-X communication module according to an aspect of the invention.

DETAILED DESCRIPTION OF THE PREFERRED EMBODIMENTS

FIG. 1 is a schematic representation of a vehicle 10. The vehicle 10 comprises four wheels 20, 22, 24, 26, with which it is able to travel along a street. For the purpose of simplification, components of a drive train or steering, and similar equipment, which are of no, or only minor relevance, to the implementation of the invention, are not shown in FIG. 1.

The vehicle 10 comprises a vehicle-to-X communication module 30 according to an exemplary embodiment. This is connected to an antenna 35, whereby direct communication with other vehicles and with infrastructure facilities is possible, referred to as vehicle-to-X-communication. Furthermore, communication with a cellular network is possible.

The vehicle 10 also has a satellite navigation module 40. This is configured to receive satellite signals and to determine the position of the vehicle 10 as a function of these.

The vehicle-to-X communication module 30 and the satellite navigation module 40 are connected via a bus system 11 of the vehicle 10, allowing them to communicate with one another. An internal vehicle clock 12 and other components are also connected to the bus system 11, denoted jointly by reference numeral 14.

The components described are configured to behave in the manner described in the following. During a journey the satellite navigation module 40 continuously determines the position of the vehicle 10 using satellite navigation signals. If the vehicle is stopped and the ignition switched off, the satellite navigation module 40 sends its operating data in the form of almanac data and ephemerides data to the vehicle-to-X communication module 30. There they are stored in a local memory, wherein the vehicle-to-X communication module simultaneously reads out a time from the clock 12 and stores this along with the operating data as the switch-off time.

If the vehicle 10 is restarted, particularly by switching on the ignition, the vehicle-to-X communication module 30 initially checks if the operating data are still valid. To this end, it accesses the clock 12 and determines the current time, which is referred to as the switch-on time. If the switch-on time and switch-off time are less than two hours apart, then the vehicle-to-X communication module 30 sends the operating data via the bus system 11 to the satellite navigation module 40. If the time between these is longer, however, the operating data are no longer valid. In this case the vehicle-to-X communication module 30 sends a message via the antenna 35, wherein the message contains a request to vehicles in its vicinity to send operating data for satellite navigation modules to the vehicle 10. If such a vehicle is in the vicinity and sends the operating data, then the vehicle-to-X communication module 30 receives these operating data via the antenna 35 and then forwards them to the satellite navigation module 40. If no such vehicle is in the vicinity, then the vehicle-to-X communication module 30 requests via the cellular network already mentioned above corresponding operating data, which it then receives via Assisted GPS (AGPS). The operating data received in this way are then similarly forwarded to the satellite navigation module 40.

Upon system start-up, also particularly upon vehicle 10 start-up, the vehicle-to-X communication module also receives from the other components 14 connected to the bus system 11 vehicle speed data and vehicle direction of travel data. It passes these on to the satellite navigation module 40, allowing it to better determine the position of the vehicle 10. With the advance calculation/ire this way the speeds at which the satellites are fixed or located can be improved. The start-up behavior of the system is improved. The vehicle-to-X communication module 30 is furthermore configured to forward the time data received from the clock 12 to the satellite navigation module 40. Thus, the position determination can similarly be improved.

The claims in the application are not intended to be at the expense of achieving broader protection.

If in the course of the proceedings it transpires that a feature or a group of features is not absolutely necessary, then the applicant here and now seeks a wording of at least one independent claim, no longer comprising the feature or the group of features. This may, by way of example, involve a subcombination of a claim existing as at the application date or a subcombination of a claim existing as at the application date restricted by further features.

Such newly worded claims or combinations of features are understood to also be covered by the disclosure of this application.

It is also pointed out that configurations, features and variants of the invention, which are described in the various implementations or exemplary embodiments and/or in the figures, are combinable with one another as desired. Individual or multiple features are interchangeable as desired. Resulting combinations of features are understood to also be covered by the disclosure of this application.

Back references in dependent claims should not be construed as a waiver of the right to independent, objective protection for the features of the subclaims referred back to. These features can be used in any combination with other features.

Features which are only disclosed in the description or features which are disclosed in the description or a claim only in conjunction with other features can, in principle, be of independent inventive relevance. They can therefore also be individually included in the claims to distinguish from the prior art.

The invention claimed is:

1. A vehicle-to-X communication module for a vehicle, including:
   a transceiver configured to exchange data with other vehicles; and
   a processor configured to send operating data including at least one of satellite almanac data or satellite ephemeris data to a satellite navigation module that is arranged in the vehicle and configured to compute a position of the vehicle based on the operating data,
   wherein the operating data is received by the transceiver from another vehicle when a stored operating data is determined to be invalid.

2. The vehicle-to-X communication module according to claim 1,
which is configured, in response to an impending switching off of the satellite navigation module, to receive and store operating data from the satellite navigation module.

3. The vehicle-to-X communication module according to claim 2,
which is configured, in response to a switching on of the satellite navigation module to send the stored operating data to the satellite navigation module.

4. The vehicle-to-X communication module according to claim 1,
which is configured to receive the operating data in a vehicle-to-X message directly from the other vehicle.

5. The vehicle-to-X communication module according to claim 1,
which is configured to send a message to another vehicle or a plurality of other vehicles, wherein the message contains a request to send operating data to the vehicle.

6. The vehicle-to-X communication module according to claim 5,
which is configured to send the message containing a request to send operating data, in a vehicle-to-X message directly to the other vehicle or the other vehicles.

7. The vehicle-to-X communication module according to claim 1,
which is configured to receive the operating data via a cellular network, by an Assisted GPS (AGPS).

8. The vehicle-to-X communication module according to claim 1,
which is configured to send vehicle speed data and/or vehicle direction of travel data to the satellite navigation module, together with the operating data.

9. The vehicle-to-X communication module according to claim 1,
which is configured to check and/or determine location data of the vehicle as a component of the operating data prior to sending the operating data by comparing these with an environment status and/or by determining a distance to a known object.

10. The vehicle-to-X communication module according to claim 1,
which is configured to send time data as a component of the operating data to the satellite navigation module.

11. The vehicle-to-X communication module according to claim 10,
which is configured to receive the time data from a local time reference or from another vehicle.

12. The vehicle-to-X communication module according to claim 1,
wherein the operating data comprise almanac data and/or ephemerides data.

13. The vehicle-to-X communication module according to claim 4,
which is configured to send a message to another vehicle or a plurality of other vehicles, wherein the message contains a request to send operating data to the vehicle.

14. The vehicle-to-X communication module according claim 4,
which is configured to receive the operating data from another vehicle in response to the stored operating data being found to be invalid;
and/or
which is configured to send the message containing a request to send operating data in response to the stored operating data being found to be invalid.

15. The vehicle-to-X communication module according claim 5,
which is configured to receive the operating data from another vehicle in response to the stored operating data being found to be invalid;
and/or
which is configured to send the message containing a request to send operating data in response to the stored operating data being found to be invalid.

16. The vehicle-to-X communication module according claim 6,
which is configured to receive the operating data from another vehicle in response to the stored operating data being found to be invalid;
and/or
which is configured to send the message containing a request to send operating data in response to the stored operating data being found to be invalid.

17. A vehicle-to-X communication module for a vehicle, including:
a transceiver configured to exchange data with other vehicles; and
a processor configured to:
send operating data to a satellite navigation module that is arranged in the vehicle and compute a position of the vehicle based on the operating data, in response to an impending switching off of the satellite navigation module, receive and store the operating data from the satellite navigation module, in response to a switching on of the satellite navigation module, send the stored operating data to the satellite navigation module, and
in response to a switching on of the satellite navigation module, initially check if the operating data are still valid, on the basis of a time that has elapsed since the switching off, and to only send the operating data to the satellite navigation module if the operating data are still valid.

18. A vehicle-to-X communication module for a vehicle, including:
a transceiver configured to exchange data with other vehicles; and
a processor configured to:
send operating data to a satellite navigation module that is arranged in the vehicle and compute a position of the vehicle based on the operating data, receive the operating data from another vehicle in response to the operating data being found to be invalid, and/or send the message containing a request to send operating data in response to the operating data being found to be invalid.

* * * * *